(12) United States Patent
Chern et al.

(10) Patent No.: US 10,197,800 B2
(45) Date of Patent: Feb. 5, 2019

(54) OPTICAL LENS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 295 days.

(21) Appl. No.: 14/926,841

(22) Filed: Oct. 29, 2015

(65) Prior Publication Data
US 2017/0090191 A1 Mar. 30, 2017

(30) Foreign Application Priority Data

Sep. 25, 2015 (CN) .......................... 2015 1 0622561
Sep. 25, 2015 (TW) ............................ 104131868 A

(51) Int. Cl.
*G02B 1/11* (2015.01)
*G02B 5/18* (2006.01)
*G02B 7/02* (2006.01)
*G02B 27/00* (2006.01)

(52) U.S. Cl.
CPC ............ *G02B 27/0037* (2013.01); *G02B 1/11* (2013.01); *G02B 5/1814* (2013.01); *G02B 7/02* (2013.01); *G02B 27/0018* (2013.01)

(58) Field of Classification Search
CPC ................................ G02B 1/118; G02B 27/642
See application file for complete search history.

(56) References Cited

U.S. PATENT DOCUMENTS

| | | | | |
|---|---|---|---|---|
| 2002/0044345 | A1* | 4/2002 | Takeuchi ............. | G02B 5/1814 359/361 |
| 2003/0076594 | A1* | 4/2003 | Kramer ................ | G02B 5/1866 359/569 |
| 2007/0247718 | A1* | 10/2007 | Yoshikawa ............... | G02B 1/11 359/614 |
| 2009/0201595 | A1* | 8/2009 | Matsumoto ............ | G02B 7/023 359/822 |
| 2009/0257127 | A1* | 10/2009 | Okayama ................ | G02B 1/11 359/601 |
| 2012/0134028 | A1* | 5/2012 | Maruyama ........... | G02B 3/0031 359/601 |
| 2012/0300301 | A1* | 11/2012 | Ando ................... | G02B 5/1814 359/565 |
| 2014/0139923 | A1* | 5/2014 | Murata .................... | G02B 3/08 359/576 |

* cited by examiner

*Primary Examiner* — Kimberly N. Kakalec
(74) *Attorney, Agent, or Firm* — Muncy, Geissler, Olds & Lowe, P.C.

(57) ABSTRACT

An optical lens includes a substrate, at least one derivative structure and a diffractive optical structure. The substrate has an optically operable region and a derivatively operable region. The derivatively operable region is arranged around the optically operable region. The derivative structure is disposed on the derivatively operable region to increase structural strength of the optical lens and to reduce the stray light as being assembled in a module. The diffractive optical structure is disposed on the optically operable region, and includes a microstructure pattern for generating a structured light and/or correcting the optical defects. Consequently, the optical lens is suitable for miniaturization and assembling applications to a module.

19 Claims, 5 Drawing Sheets

OPTICAL LENS

FIELD OF THE INVENTION

The present invention relates to an optical lens, and more particularly to a diffractive optical lens with a re-distributed or additional structure for improving the performance and mechanical strength when embedding in a lens module.

BACKGROUND OF THE INVENTION

Recently, with the development of electronic industries and the advance of industrial technologies, various electronic devices are designed toward small size, light weightiness and comfortable portability. Consequently, these electronic devices can be applied to mobile business, entertainment or leisure purposes whenever or wherever the users are. For example, many imaging devices are widely used in many kinds of fields such as smart phones, wearable electronic devices or any other appropriate electronic devices. Since the imaging devices are small and portable, the users can take the imaging devices to capture images and store the images according to the users' demands. Alternatively, the images can be uploaded to the internet through mobile networks. In other words, these electronic devices not only have important commercial values but also provide more colorful lives to people.

As a consequence, the physical volume of the optical lens module applied to the imaging device is dramatically reduced. That is, the demands on the smaller thickness of the optical lens module and the smaller diameter of the optical lens module are increased correspondingly. FIG. 1 is a schematic cutaway view of a conventional optical lens module. As shown in FIG. 1, the process of assembling the optical lens module 9 is very complicated. For example, plural lenses 91 of the optical lens module 9 are installed and fixed in a barrel 93 through additional fixing structures 92. Moreover, a stray light baffle 94 is installed in the barrel 93 to prevent the stray light from passing through the lenses 91. Because of these components or structures, it is difficult to achieve miniaturization of the whole optical lens module 9. Moreover, since most lenses 91 are produced by an injection molding process, warping deformation or residual stress is possibly generated during the injection molding process. As a consequence, the difficulty of assembling the optical lens module 9 is also increased.

Moreover, for increasing the reliability of the miniature optical lens module 9, the following assembling items should be taken into consideration. Firstly, it is important to know how to increase the structural strength of the lenses 91 after the lenses 91 are assembled to the barrel 93. Secondly, it is important to know how to reduce or avoid generation of the warping deformation or residual stress of the lenses 91 during the injection molding process. After the warping deformation or residual stress is reduced or avoided, the subsequent process of assembling the optical lens module 9 will become easier, and the undesired or abrupt aberration caused by optical path variation because of the change of refractive index will be avoided. Thirdly, it is important to know how to simplify the assembled structures of the optical lens module 9 (e.g., the stray light baffle 94 or the fixing structures 92 for fixing the lenses 91 in the barrel 93) in order to simplify the assembling process of the optical lens module 9.

Nowadays, a diffractive optical lens is available in market. The diffractive optical lens is applied to the optical lens module 9 to enhance the imaging quality, for example correct aberration or eliminate chromatic dispersion. FIG. 2 is a schematic perspective view illustrating the outer appearance of a conventional diffractive optical lens. FIG. 3 is a schematic cross-sectional view illustrating the conventional diffractive optical lens of FIG. 2. As shown in FIGS. 2 and 3, the outer appearance of the diffractive optical lens is similar to the outer appearance of the general lens 91. However, the inner portion of the diffractive optical lens 8 has a diffractive structure of grating 81. The diffractive structure of grating 81 is used for modulating the light beams that pass through the diffractive optical lens 8, thereby correcting aberration or eliminating chromatic dispersion.

Generally, the diffractive optical lens 8 has a pure lens structure. That is, the entire of the diffractive optical lens 8 is an optically effective region. Consequently, in case that the diffractive optical lens 8 is applied to the miniature optical lens module, the above assembling items still need to be taken into consideration. For example, an additional fixing structure is required to install and fix the diffractive optical lens 8 in the barrel of the optical lens module.

Conventionally, since the light beams for the diffractive optical lens are in a specified wavelength range, the applications of the diffractive optical lens are limited. However, some optical products such as depth cameras, TOF cameras (time of flight cameras), infrared CCTV cameras and thermal imagers are increasingly concerned by the market, and thus the market scale of these optical products is gradually widened. Since these optical products are applied to specified wavelength ranges, the manufacturers have to pay much attention to the applications of the diffractive optical lenses.

From the above descriptions, it is an important issue to improve the structure and fabricating process of the diffractive optical lens in order to increase the available wavelength range and avoid the generation of warping deformation or residual stress during the injection molding process. Moreover, it is also important to simplify the constituents of the optical lens module by the improvement of the diffractive optical lens and increase the structural strength of the structural strength of the optical lens module after the optical lens module is assembled to the barrel. Consequently, the subsequent process of assembling the optical lens module is easier, and the overall performance is enhanced.

SUMMARY OF THE INVENTION

An object of the present invention provides an optical lens for overcoming the drawbacks of the conventional technologies. The optical lens includes a diffractive optical structure and a derivative structure which is located typically, but not necessarily, outside the corresponding optical region or the diffractive optical structure. Consequently, the optical lens is suitable for miniaturization and assembling applications. Moreover, the diffractive optical structure and the derivative structure are formed on a substrate by an imprinting process or a spray coating process. Consequently, the problem of generating warping deformation or residual stress during formation of the optical lens is solved. Under this circumstance, the structure of the device with the optical lens is simplified, and the subsequent assembling process becomes easier.

In accordance with an aspect of the present invention, there is provided an optical lens. The optical lens includes a substrate, at least one derivative structure and a diffractive optical structure. The substrate has an optically operable region and a derivatively operable region. The derivatively operable region is arranged around the optically operable region. The at least one derivative structure is disposed on the derivatively operable region. The diffractive optical structure is disposed on the optically operable region, and has at least one microstructure pattern. A structured light is generated after a light beam passes through the at least one microstructure pattern, and/or at least one optical defect is corrected by the at least one microstructure pattern.

In an embodiment, the at least one optical defect includes aberration or chromatic dispersion.

In an embodiment, the maximum thickness of the optical lens is smaller than 0.4 mm.

In an embodiment, a difference between refractive indexes of any two of the diffractive optical structure, the at least one derivative structure and the substrate is smaller than 5%.

In an embodiment, the diffractive optical structure is formed on the substrate by an imprinting process or a spray coating process.

In an embodiment, the at least one derivative structure is formed on the substrate by an imprinting process or a spray coating process.

In an embodiment, the at least one derivative structure is assembled with a barrel. While the at least one derivative structure is assembled with the barrel, the at least one derivative structure increases structural strength of the optical lens and/or reduces a portion of a stray light to be diffused or directed toward the optically operable region.

In an embodiment, the at least one derivative structure includes a stray light absorption structure.

In an embodiment, the at least one derivative structure includes small scale structures like a moth-eye-like structure or in a form of a crystal, i.e., with multiple layers and the orientation for each layer can be the same or specified differently.

In an embodiment, the stray light absorption structure has absorptivity larger than 80%.

In an embodiment, the at least one derivative structure includes plural derivative structures, wherein the plural derivative structures are symmetrically arranged with respect to an optical axis of the optical lens.

In an embodiment, the derivative structure provides a directional mark while the optical lens is installed.

In an embodiment, the optical lens is applied to a tilt-shift optical system, and the at least one derivative structure comprises plural derivative structures, wherein the plural derivative structures are asymmetrically arranged.

In an embodiment, the at least one derivative structure includes plural convex structures, and the plural convex structures are discretely arranged on the optically operable region at regular intervals with respect to a center of the optical lens.

In an embodiment, a surface of the substrate has the optically operable region and the derivatively operable region, wherein the surface of the substrate is a flat surface or a curvy surface.

In an embodiment, the substrate has a circular shape or a rectangular shape.

In an embodiment, the substrate is a prism or a polygonal block.

In an embodiment, the substrate includes at least one perforation, and at least one microstructure is arranged around the at least one perforation. When a light beam strikes an edge of the at least one perforation, the at least one microstructure destroys edge diffraction of the light beam.

In an embodiment, at least one of an anti-reflection coating and a high reflection coating is further formed on the optical lens.

In an embodiment, the anti-reflection coating has transmittance larger than 95%.

From the above descriptions, the optical lens of the present invention has the following advantages. Firstly, since the optical lens has the diffractive optical structure and the derivative structure and the microstructure pattern of the diffractive optical structure is designed according to the practical requirements, the optical performance of the optical lens in the available wavelength range is enhanced. Secondly, since the diffractive optical structure and the derivative structure are formed on the substrate by an imprinting process or a spray coating process, the overall thickness of the optical lens can be effectively reduced. Thirdly, since the optical lens of the present invention is not produced by the injection molding process, the problem of generating warping deformation or residual stress during formation of the optical lens is solved. Consequently, the subsequent assembling process will become easier, and the undesired or abrupt aberration caused by optical path variation because of the change of refractive index will be avoided. Fourthly, the optical lens has a stray light absorption structure for absorbing the stray light or reducing diffraction of the stray light. When the optical lens is applied to an optical lens module, the optical lens can replace the stray light baffle of the conventional optical lens module, so that the structure of the optical lens module is simplified. In other words, the miniaturization of the optical lens is achieved, and the procedure of assembling the optical lens is simplified. Fifthly, since the optical lens has the derivative structure matching the barrel of the applied device, the derivative structure can replace the additional fixing structure of the conventional device for fixing the optical lens, and the structure of the optical lens module is simplified. In other words, the miniaturization of the optical lens is achieved, and the procedure of assembling the optical lens is simplified. Moreover, according to the mechanical analysis and the structural design of the derivative structure, the structural strength of the optical lens is increased when the optical lens is installed and fixed in the optical lens module. Sixthly, the derivative structure of the optical lens further provides a directional mark during the process of installing the optical lens. Consequently, the procedure of installing the optical lens is simplified and time-saving.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
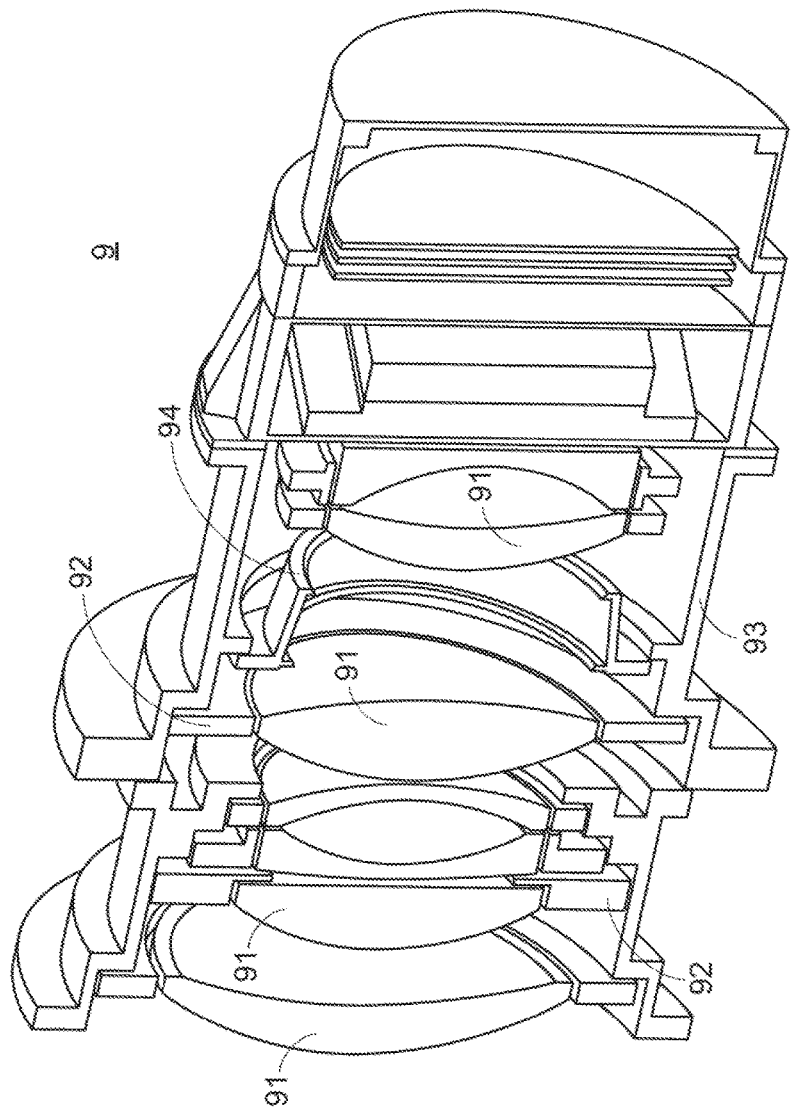
FIG. 1 is a schematic cutaway view of a conventional optical lens module.
Figure 2:
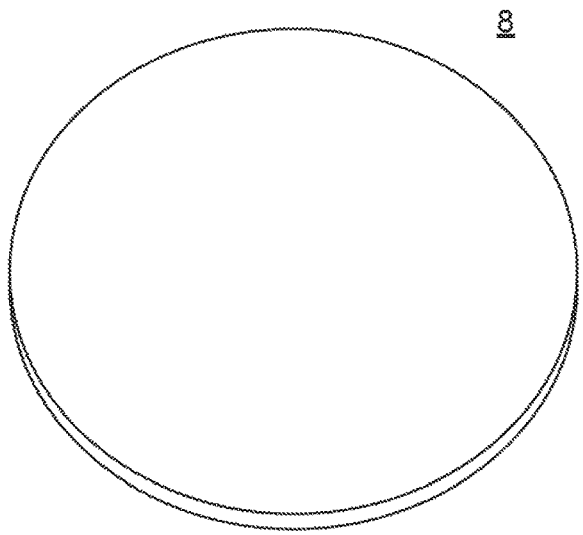
FIG. 2 is a schematic perspective view illustrating the outer appearance of a conventional diffractive optical lens.
Figure 3:
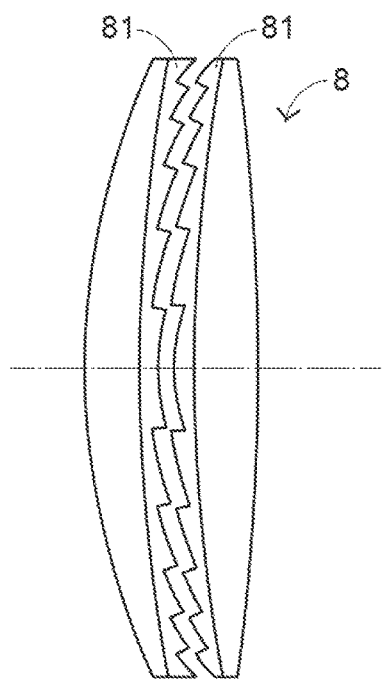
FIG. 3 is a schematic cross-sectional view illustrating the conventional diffractive optical lens of FIG. 2.
Figure 4:
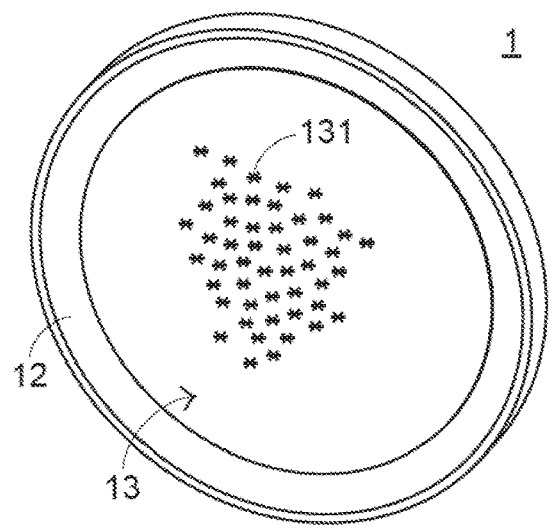
FIG. 4 is a schematic perspective view illustrating the outer appearance of an optical lens according to a first embodiment of the present invention.
Figure 5:
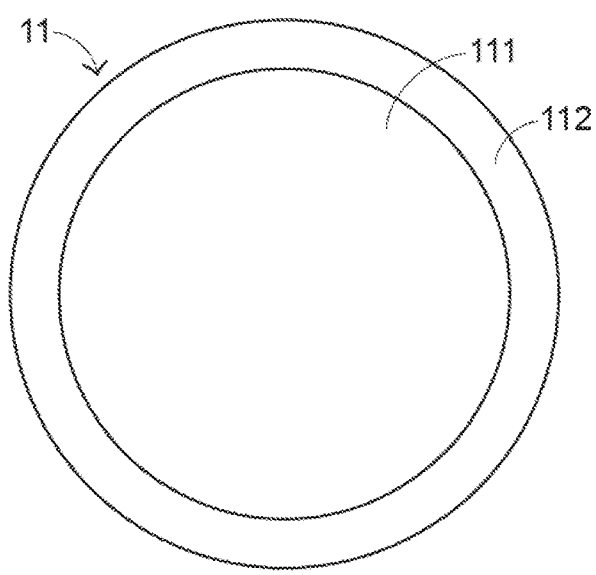
FIG. 5 is a schematic top view illustrating a substrate of the optical lens of FIG. 4.
Figure 6:
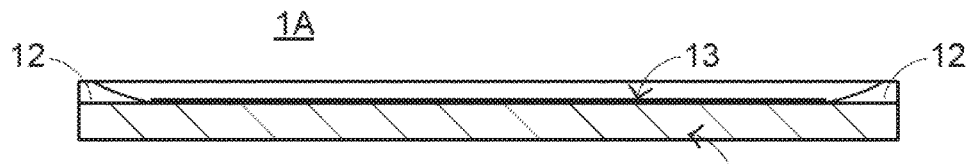
FIG. 6 is a schematic cross-sectional view illustrating the optical lens of FIG. 4.

Please refer to FIGS. 4, 5 and 6. FIG. 4 is a schematic perspective view illustrating the outer appearance of an optical lens according to a first embodiment of the present invention. FIG. 5 is a schematic top view illustrating a substrate of the optical lens of FIG. 4. FIG. 6 is a schematic cross-sectional view illustrating the optical lens of FIG. 4. The optical lens 1A comprises a substrate 11, a derivative structure 12 and a diffractive optical structure 13. Preferably but not exclusively, the substrate 11 is made of a glass material, a plastic material or a semiconductor material. A surface of the substrate 11 is divided into an optically operable region 111 (also referred as an optically effective region) and a derivatively operable region 112. The derivatively operable region 112 is arranged around the optically operable region 111. The derivative structure 12 is disposed on the derivatively operable region 112 (typically, but not necessarily, located outside the corresponding optical region or the diffractive optical structure). The diffractive optical structure 13 is disposed on the optically operable region 111. Moreover, the diffractive optical structure 13 has a microstructure pattern 131. After a light beam passes through the microstructure pattern 131, a structured light is generated. Alternatively, the microstructure pattern 131 can correct optical defects, for example correct aberration or eliminate chromatic dispersion. Moreover, the microstructure pattern 131 of the diffractive optical structure 13 can enhance the optical performance of the optical lens 1A in the available wavelength range.

In this embodiment as shown in FIGS. 4, 5 and 6, the substrate 11 has a shape of a circular plate, and the surface of the substrate 11 with the optically operable region 111 and the derivatively operable region 112 is a flat surface. It is noted that numerous modifications and alterations may be made while retaining the teachings of the invention. For example, in another embodiment, the surface of the substrate 11 with the optically operable region 111 and the derivatively operable region 112 is a curvy surface. Moreover, the substrate 11 may be designed to have any shape according to the practical requirements. For example, the substrate 11 has a shape of rectangular plate, a shape of triangular pyramid or an irregular shape. Moreover, the optically operable region 111 may be designed to have a rectangular shape, an elliptic shape or an irregular shape according to the practical requirements.

After the derivative structure 12 is assembled with a barrel (not shown), the optical lens 1A is installed and fixed in the barrel. In this context, the term "barrel" indicates a casing of any device where the optical lens 1A is applied. For example, the barrel is a barrel of an optical lens module. When the optical lens 1A is installed and fixed in the barrel, the derivative structure 12 is effective to increase the structural strength of the optical lens 1A and reduce the portion of the stray light to be diffused or directed toward the optically operable region 111.

Preferably but not restricted, the derivative structure 12 further comprises a stray light absorption structure (not shown) for absorbing undesired stray light. The absorptivity of the stray light absorption structure is larger than 80%. For example, the stray light absorption structure includes a small-scale micro-structure pattern in a distribution like moth-eye-like structure and/or in a form of a crystal in which multiple layers are embedded and the orientation of each layer can be different. In case that the derivative structure 12 includes both of the moth-eye-like structure and the photonic crystal, the moth-eye-like structure and the photonic crystal are partially or completely overlapped with each other.

In an embodiment, the diffractive optical structure 13 and/or the derivative structure 12 are formed on the substrate 11 by an imprinting process or a spray coating process. Moreover, according to the practical requirements, the diffractive optical structure 13 and the derivative structure 12 are separately formed on the substrate 11, or the diffractive optical structure 13 and the derivative structure 12 are simultaneously formed on the substrate 11 by the imprinting process or the spray coating process. Since the diffractive optical structure 13 and the derivative structure 12 are formed on the substrate 11 by the imprinting process or the spray coating process, the overall thickness of the optical lens 1A is effectively reduced. Moreover, since the optical lens 1A is produced by the injection molding process, the possibility of generating warping deformation or residual stress during the injection molding process will be minimized.

Preferably but not exclusively, the imprinting process and the spray coating process are a nano-imprinting process and a nano-spray coating process, respectively. Moreover, the maximum thickness of the optical lens 1A is smaller than 0.4 mm. The difference between the refractive indexes of any two of the diffractive optical structure 13, the derivative structure 12 and the substrate 11 is smaller than 5%. Consequently, when the light beam passes through the optical lens 1A, the possibility of causing undesired multiple reflection or reflection will be minimized. In other words, the design complexity is reduced, and the stray light is avoided.

The present invention is related to the method of designing the microstructure pattern 131 of the diffractive optical structure 13 to allow the light beam to pass through and generate the desired structured light, the method of designing the microstructure pattern 131 of the diffractive optical structure 13 to correct optical defects (e.g., aberration or chromatic dispersion) and the method of performing mechanical analysis of the derivative structure 12 to increase the structural strength when the optical lens 1A is installed and fixed in the barrel. These methods are well known to those skilled in the art, and are not redundantly described herein.

Figure 7:
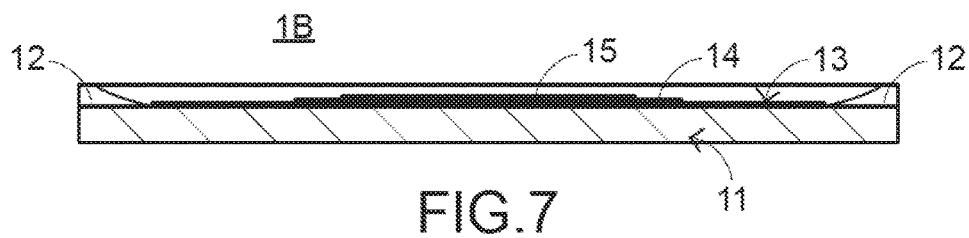
FIG. 7 is a schematic side view illustrating an optical lens according to a second embodiment of the present invention.

FIG. 7 is a schematic side view illustrating an optical lens according to a second embodiment of the present invention. The components of the optical lens 1B of this embodiment which are similar to those of the first embodiment are not redundantly described herein. In comparison with the first embodiment, the optical lens 1B of this embodiment further comprises an anti-reflection coating 14 and a high reflection coating 15. The anti-reflection coating 14 is arranged between the diffractive optical structure 13 and the high reflection coating 15. The transmittance of the anti-reflection coating 14 is larger than 95%. Moreover, the diffractive optical structure 13, the anti-reflection coating 14 and the high reflection coating 15 are partially or completely overlapped with each other. Consequently, when plural optical lenses containing the optical lens 1B are assembly, the overall stray light and the ghosting effect will be eliminated or reduced. The transmittance of the anti-reflection coating 14 is presented herein for purpose of illustration and description only. It is noted that numerous modifications and alterations may be made while retaining the teachings of the invention. For example, the relative locations between the diffractive optical structure 13, the anti-reflection coating 14 and the high reflection coating 15 may be varied according to the practical requirements.

Figure 8:
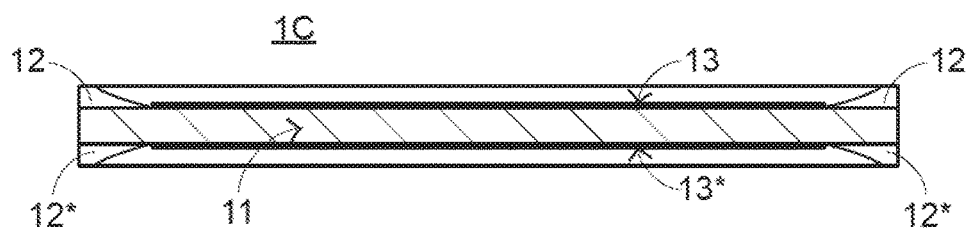
FIG. 8 is a schematic side view illustrating an optical lens according to a third embodiment of the present invention.

FIG. 8 is a schematic side view illustrating an optical lens according to a third embodiment of the present invention. The components of the optical lens 1C of this embodiment which are similar to those of the first embodiment are not redundantly described herein. In comparison with the first embodiment, a second surface of the substrate 11 is also divided into a second optically operable region and a second derivatively operable region. A second diffractive optical structure 13* is disposed on the second optically operable region. A second derivative structure 12* is disposed on the second optically operable region. The second diffractive optical structure 13* also has a microstructure pattern (not shown). The microstructure patterns of the two diffractive optical structures 13 and 13* on the two opposite surfaces of the substrate 11 are identical or different according to the practical requirements.

Figure 9:
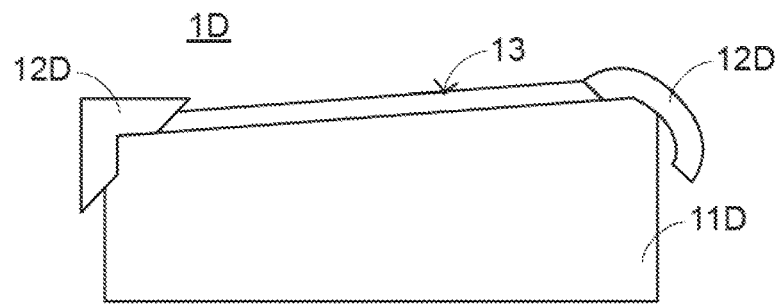
FIG. 9 is a schematic side view illustrating an optical lens according to a fourth embodiment of the present invention.

FIG. 9 is a schematic side view illustrating an optical lens according to a fourth embodiment of the present invention. The components of the optical lens 1D of this embodiment which are similar to those of the first embodiment are not redundantly described herein. In comparison with the first embodiment, the substrate 11D of the optical lens 1D of this embodiment is a prism. A surface of the prism is divided into a second optically operable region and a second derivatively operable region. The diffractive optical structure 13 is disposed on the optically operable region. The derivative structure 12 is disposed on the second optically operable region. It is noted that the substrate 11D is not restricted to the prism. For example, in another embodiment, the substrate is a polygonal block.

Figure 10:
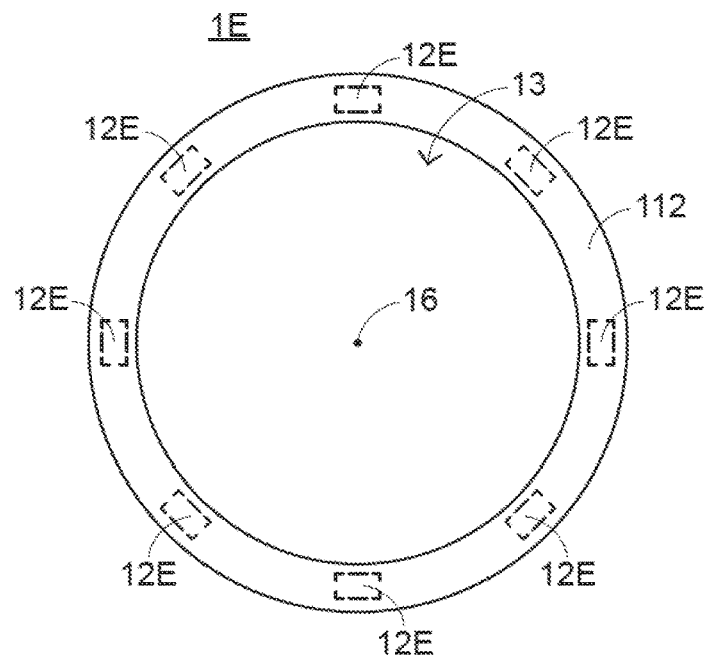
FIG. 10 is a schematic top view illustrating an optical lens according to a fifth embodiment of the present invention.

FIG. 10 is a schematic top view illustrating an optical lens according to a fifth embodiment of the present invention. The components of the optical lens 1E of this embodiment which are similar to those of the first embodiment are not redundantly described herein. In comparison with the first embodiment, the optical lens 1E comprises plural derivative structures 12E. The plural derivative structures 12E are disposed on the optically operable region 112 of the substrate 11. Moreover, these derivative structures 12E are symmetrically arranged with respect to an optical axis 16 of the optical lens 1E. In this embodiment, the plural derivative structures 12E are convex structures, and the convex structures are discretely arranged on the optically operable region 112 at regular intervals with respect to the center of the optical lens 1E.

It is noted that numerous modifications and alterations may be made while retaining the teachings of the invention. For example, in case that the optical lens 1E is applied to a tilt-shift optical system, these derivative structures 12E are asymmetrically arranged. Consequently, the optical path of at least a portion of the light beam to be incident to the optical lens 1E is adjustable.

In the above embodiments, the derivative structure may further provide a directional mark during the process of installing the optical lens. In some situations, the diffractive optical structure has directivity. In response to the directivity of the diffractive optical structure, the directional mark is formed at a specified location of the derivative structure. Alternatively, in response to the directivity of the diffractive optical structure, the optical lens has plural derivative structure in a specified arrangement so as to guide the user to correctly install the optical lens. Consequently, the procedure of installing the optical lens is simplified and time-saving.

Figure 11:
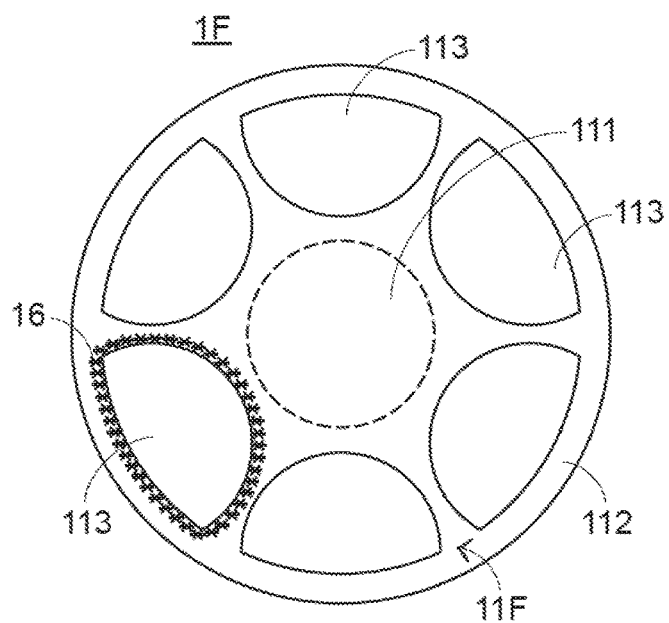
FIG. 11 is a schematic top view illustrating an optical lens according to a sixth embodiment of the present invention.

FIG. 11 is a schematic top view illustrating an optical lens according to a sixth embodiment of the present invention. The components of the optical lens 1F of this embodiment which are similar to those of the first embodiment are not redundantly described herein. For example, the substrate 11F of the optical lens 1F also comprises an optically operable region 111 and a derivatively operable region 112, and the diffractive optical structure (not shown) and the derivative structure are disposed on the optically operable region 111 and a derivatively operable region 112, respectively. In comparison with the first embodiment, the substrate 11F of this embodiment further comprises plural perforations 113. Moreover, plural microstructures 16 are arranged around at least one perforation 113. When the light beam strikes the edge of the at least one perforation 113, the plural microstructures 16 can destroy the edge diffraction of the light beam.

From the above descriptions, the optical lens of the present invention has the following advantages. Firstly, since the diffractive optical structure and the derivative structure are formed on the substrate by an imprinting process or a spray coating process, the overall thickness of the optical lens can be effectively reduced. Secondly, since the microstructure pattern of the diffractive optical structure can be designed, the optical performance of the optical lens in the available wavelength range is enhanced. Thirdly, since the optical lens of the present invention is not produced by the injection molding process, the problem of generating warping deformation or residual stress during formation of the optical lens is solved effectively. Consequently, the subsequent assembling process will become easier, and the undesired or abrupt aberration caused by optical path variation because of the change of refractive index will be avoided. Fourthly, the optical lens has a stray light absorption structure for absorbing the stray light or reducing diffraction of the stray light. When the optical lens is applied to an optical lens module, the optical lens can replace the stray light baffle of the conventional optical lens module, so that the structure of the optical lens module is simplified. In other words, the miniaturization of the optical lens is achieved, and the procedure of assembling the optical lens is simplified. Fifthly, since the optical lens has the derivative structure matching the barrel of the applied device, the derivative structure can replace the additional fixing structure of the conventional device for fixing the optical lens, and the structure of the optical lens module is simplified. In other words, the miniaturization of the optical lens is achieved, and the procedure of assembling the optical lens is simplified. Moreover, according to the mechanical analysis and the structural design of the derivative structure, the structural strength of the optical lens is increased when the optical lens is installed and fixed in the optical lens module. Sixthly, the derivative structure of the optical lens further provides a directional mark during the process of installing the optical lens. Consequently, the procedure of installing the optical lens is simplified and time-saving.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical lens, comprising:
   a substrate having an optically operable region and a derivatively operable region, wherein the derivatively operable region is arranged around the optically operable region, and the substrate comprises at least one perforation, and at least one microstructure is arranged around the at least one perforation, wherein when a light beam strikes an edge of the at least one perforation, the at least one microstructure destroys edge diffraction of the light beam;
   at least one derivative structure disposed on the derivatively operable region, wherein the derivative structure has a surface obliquely extended upwardly and outwardly or the derivative structure covers a corner of the substrate; and
   a diffractive optical structure disposed on the optically operable region, and having at least one microstructure pattern, wherein a structured light is generated after a light beam passes through the at least one microstructure pattern, and/or at least one optical defect is corrected by the at least one microstructure pattern.

2. The optical lens according to claim 1, wherein the at least one optical defect includes aberration or chromatic dispersion.

3. The optical lens according to claim 1, wherein the maximum thickness of the optical lens is smaller than 0.4 mm.

4. The optical lens according to claim 1, wherein a difference between refractive indexes of any two of the diffractive optical structure, the at least one derivative structure and the substrate is smaller than 5%.

5. The optical lens according to claim 1, wherein the diffractive optical structure is formed on the substrate by an imprinting process or a spray coating process.

6. The optical lens according to claim 1, wherein the at least one derivative structure is formed on the substrate by an imprinting process or a spray coating process.

7. The optical lens according to claim 1, wherein the at least one derivative structure is assembled with a barrel, wherein while the at least one derivative structure is assembled with the barrel, the at least one derivative structure increases structural strength of the optical lens and/or reduces a portion of a stray light to be diffused or directed toward the optically operable region.

8. The optical lens according to claim 1, wherein the at least one derivative structure includes a stray-light absorption structure.

9. The optical lens according to claim 8, wherein the at least one derivative structure includes a small-scale microstructure patterns in a distribution like moth-eye-like structure or a distributed regular structure with multiple layer like a crystal in which the orientation of each layer is specified.

10. The optical lens according to claim 8, wherein the stray-light absorption structure has absorptivity larger than 80%.

11. The optical lens according to claim 1, wherein the at least one derivative structure comprises plural derivative structures, wherein the plural derivative structures are symmetrically arranged with respect to an optical axis of the optical lens.

12. The optical lens according to claim 1, wherein the derivative structure provides a directional mark while the optical lens is installed.

13. The optical lens according to claim 1, wherein the optical lens is applied to a tilt-shift optical system, and the at least one derivative structure comprises plural derivative structures, wherein the plural derivative structures are asymmetrically arranged.

14. The optical lens according to claim 1, wherein the at least one derivative structure comprises plural convex structures, and the plural convex structures are discretely arranged on the optically operable region at regular intervals with respect to a center of the optical lens.

15. The optical lens according to claim 1, wherein a surface of the substrate has the optically operable region and the derivatively operable region, wherein the surface of the substrate is a flat surface or a curved surface.

16. The optical lens according to claim 1, wherein the substrate has a circular shape or a rectangular shape.

17. The optical lens according to claim 1, wherein the substrate is a prism or a polygonal block.

18. The optical lens according to claim 1, wherein at least one of an anti-reflection coating and a high reflection coating is further formed on the optical lens.

19. The optical lens according to claim 18, wherein the anti-reflection coating has transmittance larger than 95%.

* * * * *